(12) United States Patent
McCreight, Jr.

(10) Patent No.: US 10,234,674 B2
(45) Date of Patent: Mar. 19, 2019

(54) OPTICAL ALIGNMENT SYSTEM

(71) Applicant: Burle Technologies, LLC, Wilmington, DE (US)

(72) Inventor: Robert Joseph McCreight, Jr., San Antonio, TX (US)

(73) Assignee: Photonis Defense, Inc., Lancaster, PA (US)

( * ) Notice: Subject to any disclaimer, the term of this patent is extended or adjusted under 35 U.S.C. 154(b) by 0 days.

(21) Appl. No.: 14/924,417

(22) Filed: Oct. 27, 2015

(65) Prior Publication Data

US 2016/0116730 A1    Apr. 28, 2016

Related U.S. Application Data

(60) Provisional application No. 62/069,638, filed on Oct. 28, 2014.

(51) Int. Cl.
| | | |
|---|---|---|
| *G02B 23/00* | (2006.01) | |
| *G02B 7/18* | (2006.01) | |
| *G02B 23/12* | (2006.01) | |
| *G02B 23/14* | (2006.01) | |
| *F41G 1/44* | (2006.01) | |
| *F41G 1/54* | (2006.01) | |

(52) U.S. Cl.
CPC ............ *G02B 23/125* (2013.01); *F41G 1/44* (2013.01); *F41G 1/545* (2013.01); *G02B 7/18* (2013.01); *G02B 23/12* (2013.01); *G02B 23/14* (2013.01)

(58) Field of Classification Search
CPC . G02B 7/00; G02B 7/003; G02B 7/28; G02B 7/285; G02B 7/287; G02B 7/30; G02B 23/00; G02B 23/02; G02B 23/12; G02B 23/14; G02B 23/16; G02B 23/18; G02B 5/04; G02B 7/18; G02B 7/1805; G02B 23/125; F41G 1/44; F41G 1/545

See application file for complete search history.

(56) References Cited

U.S. PATENT DOCUMENTS 3,049,972 A * 8/1962 Malinowski ........... G02B 23/18
                                                                   359/413
4,217,048 A    8/1980 Egawa
4,537,526 A * 8/1985 Hartl ...................... F16D 1/094
                                                                   403/370
(Continued)

FOREIGN PATENT DOCUMENTS

GB           543542        11/1938

OTHER PUBLICATIONS

International Search Report and Written Opinion, dated May 23, 2016, from International Application No. PCT/US2015/057626, filed on Oct. 27, 2015. Sixteen pages.

(Continued)

*Primary Examiner* — Thong Nguyen
(74) *Attorney, Agent, or Firm* — HoustonHogle LLP

(57) ABSTRACT

A coalignment system including wedge-prism assembly that can be attached to a conventional night vision scope, for example. This could allow a standard handheld night vision scope to be deployed in different modes such as on head-mounted goggles or as an augmentation scope in front of a day sight a weapon while enabling Line of sight/point of impact (LOS/POI) correction. In order to ensure maximum compatibility, the coalignment system includes diopter adjustment.

7 Claims, 10 Drawing Sheets

(56) References Cited

U.S. PATENT DOCUMENTS

| | | | | |
|---|---|---|---|---|
| 4,563,061 A | * | 1/1986 | Ellis | G02B 27/0172 359/364 |
| 4,626,081 A | * | 12/1986 | Nishizawa | G02B 7/1805 359/407 |
| 4,822,974 A | * | 4/1989 | Leighton | B23K 26/0652 219/121.67 |
| 5,596,456 A | * | 1/1997 | Luecke | G02B 27/09 359/669 |
| 5,754,339 A | | 5/1998 | Kanai et al. | |
| 6,075,644 A | * | 6/2000 | Filipovich | G02B 23/12 359/353 |
| 6,924,931 B1 | | 8/2005 | Lam et al. | |
| 7,142,357 B2 | | 11/2006 | Greenslade | |
| 2001/0026400 A1 | * | 10/2001 | Yoshikawa | G02B 23/12 359/676 |
| 2002/0024639 A1 | * | 2/2002 | Jung | H04N 9/3141 353/74 |
| 2005/0115089 A1 | | 6/2005 | Johnson | |
| 2005/0286147 A1 | * | 12/2005 | Prince | G02B 7/1805 359/833 |
| 2006/0109544 A1 | | 5/2006 | Greenslade | |
| 2008/0043322 A1 | | 2/2008 | Sauter et al. | |
| 2009/0058881 A1 | | 3/2009 | Ottney | |
| 2011/0199586 A1 | * | 8/2011 | Morikuni | G03B 21/14 353/81 |
| 2011/0310497 A1 | | 12/2011 | Ashcraft et al. | |
| 2012/0192478 A1 | | 8/2012 | Jahromi | |
| 2012/0194904 A1 | * | 8/2012 | Noguchi | G02B 25/004 359/416 |

OTHER PUBLICATIONS

Partial International Search Report, dated Feb. 2, 2016, from International Application No. PCT/US2015/057626, filed on Oct. 27, 2015. Four pages.

International Preliminary Report on Patentability, dated May 11, 2017, from International Application No. PCT/US2015/057626, filed on Oct. 27, 2015. Ten pages.

\* cited by examiner

OPTICAL ALIGNMENT SYSTEM

RELATED APPLICATIONS

This application claims the benefit under 35 U.S.C. 119(e) of U.S. Provisional Application No. 62/069,638, filed on Oct. 28, 2014, which is incorporated herein by reference in its entirety.

BACKGROUND OF THE INVENTION

U.S. Pat. No. 7,142,357 concerned a night-day boresight with an adjustable wedge-prism assembly. The basic notion was to include a wedge-prism assembly as part of night optics, but in front of day optics in a weapon bore sighting system. The wedge-prism assembly was used to compensate for image shift in the day optics caused by manufacturing and/or assembly errors in the night optics. The advantage was avoiding having to compensate for such errors in the adjustment of the day optics using, for example, the elevation and windage adjustment turrets found on common rifle scopes.

SUMMARY OF THE INVENTION

One problem associated with integrating the wedge-prism assembly with the night optics is that it increases the cost of those night optics.

On the other hand, if a coalignment system including wedge-prism assembly could be provided with standard threading, then it could be attached to a conventional night vision scope, for example. This could allow a standard handheld night vision monocular to be deployed in different modes such as on headmounted goggles or as an augmentation scope in front of a day sight of a weapon while enabling line of sight/point of impact (LOS/POI) correction.

The coalignment system can even be used with a non-adjustable day scope to eliminate the use of mechanical adjustment turrets.

In order to ensure maximum compatibility, the coalignment system includes a diopter adjustment. This optical correction in the same system/housing as a wedge prism assembly enables compatibility from person to person, or sight to sight and allows two coalignment systems to be used to co-align a goggle system. As a result, in one mode of operation, the same augmenting system can be used as a monocular or goggle or placed back in front of the day sight. The coalignment system is removable allowing use with various and existing monocular housings. The system can also allow night vision/low light tubes to be inserted and other optics to be swapped as needed. For instance, a short/mid-range set of optics (front/rear) can be provided along with a mid/long-range set for higher resolution and increased range. So, the matched sets are hot-swapped as needed. Of course the impact shift may occur, but that is easily remedied with the wedges by dialing out any error by field/user alignment.

In general, according to one aspect, the invention features a coalignment system comprising a wedge prism system and a diopter adjustment system.

In embodiments, the wedge prism system comprises two wedge prisms. A locking system is preferably included that prevents rotation of the two wedge prisms. Moreover, two grip rings can be included for rotating the two wedge prisms relative to each other.

A fronting mounting system is usually included attaching the coalignment system to another optical system, such as a night vision tube system.

In the illustrated example, the diopter adjustment system comprises a lens tube holding a lens train that moves along the optical axis relative to the wedge prism system.

In general according to another aspect, the invention features a night vision goggle system. This system comprises two vision augmenting systems and a coalignment system for at least one of the two vision augmenting systems. This allows for the alignment of the augmenting systems relative to each other.

In a preferred embodiment, two coalignment systems are provided, one for each of the two vision augmenting systems. A mounting bracket can be used for holding the two vision augmenting systems.

In one mode of operation, a first of the coalignment systems is adjusted for a day sight of a weapon and a second of the other coalignment systems is adjusted for alignment with the first coalignment system when mounted to a common mounting bracket.

The above and other features of the invention including various novel details of construction and combinations of parts, and other advantages, will now be more particularly described with reference to the accompanying drawings and pointed out in any claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
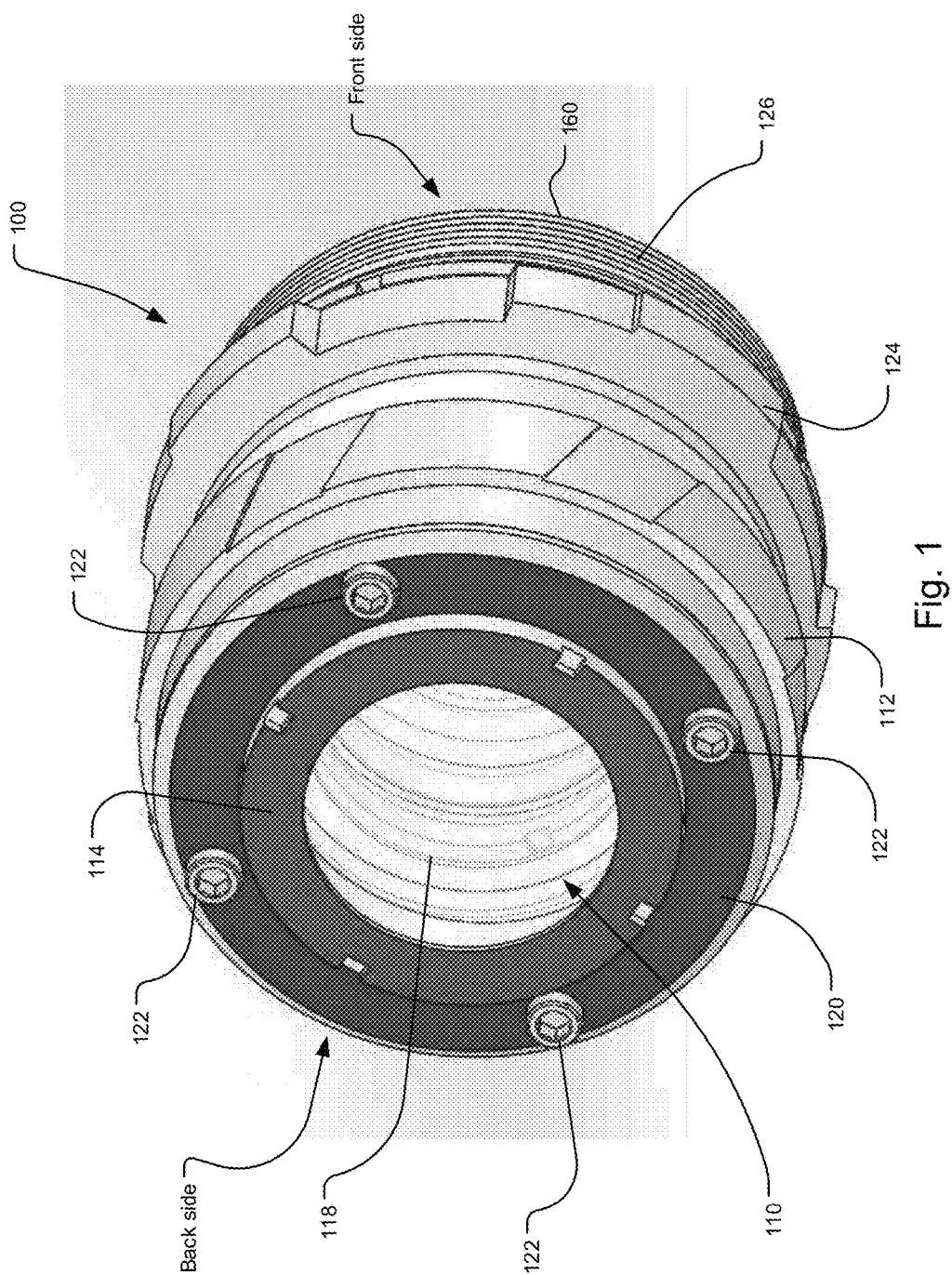
FIG. 1 is a perspective view of the inventive coalignment system showing its backside.

FIG. 1 shows a coalignment system 100 that has been constructed according to the principles of the present invention.

Important to the system 100 is the inclusion of a wedge prism system 110. This system includes a first wedge ring 112 and a second wedge ring 114 that enable the rotation of two wedge prisms around the optical axis of the coalignment system 100 and relative to each other in order to adjust the point of aim/point of impact or to enable coalignment with another parallel optical system as in the case of night vision goggles.

In more detail, looking at the back side of the coalignment system 100, a second wedge prism 118 is visible and is held on in the second wedge ring 114. In front of the second wedge prism 118 is a first wedge prism 116 that is supported by the first wedge ring.

In typical usage, the first wedge ring 112 and the second wedge ring 114 are locked to prevent rotation relative to each other by four compression ring bolts 122. These bolts form a wedge prism locking system to prevent rotation of the wedge rings 112, 114 relative to each other.

The four compression ring bolts 122 on the back side (side closest to the eye) are all loosened to free the wedge rings 112, 114 for rotation and adjustment by the user. The prisms 116, 118 of each ring 112, 114 move the light path up/down and left/right, or any combination thereof depending on the orientation of the prisms 116, 118. The key is that they correct the light path at intersecting angles/differences. If one moves the bullet impact from 4 o'clock to 10 o'clock, then the other ring would move it from 1 o'clock to 7 o'clock-much like a mechanical rifle scope adjustment. Moreover, the adjustment mechanism is accessible, enabling adjustment and correction even in the field.

In front of the first wedge ring 112 is a diopter adjustment system including a diopter adjustment ring 124, which is rotated by the user in order to adjust the diopter or focus of the coalignment system 100. Finally, at the front side are the front mounting threads 126 that form a front mounting system that enable the coalignment system 100 to be mounted to a variety of other optical systems such as a night vision tube, for example. In other embodiments, other front mounting systems are used or chosen for compatibility with different systems. As a result, the basic system can be easily separated or added as desired by the users onto a new or existing housing design, for example.

Figure 2:
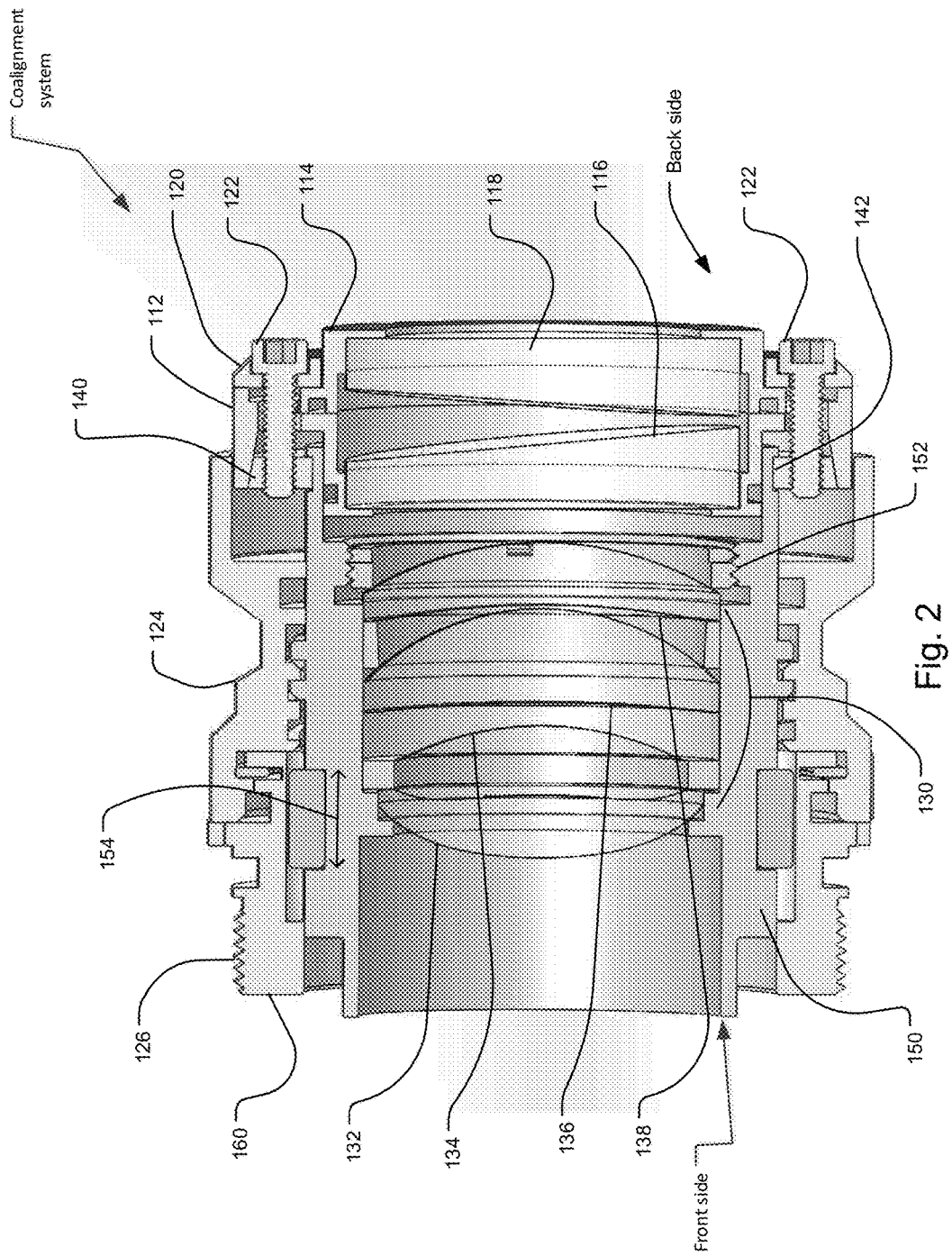
FIG. 2 is a cross-sectional view of the coalignment system.

FIG. 2 shows the coalignment system 100 in cross-section. Moving from the back of the device (the part closest to the user's eye) to the front of the device are generally the two wedge prisms 118, 116 followed by a lens train 130.

In more detail, the second wedge prism 118 is mounted to the second wedge ring 114. Forward of the second wedge prism 118 is the first wedge prism 116, which is mounted in its corresponding first wedge ring 112. The two wedge rings 112, 114 are loosened to enable their rotation relative to each other and the coalignment system 100 by loosening the compression ring bolts 122. Loosening of these bolts 122 releases the pressure on the compression ring 120 and a wedge compression plate 140 that engages a rear edge of an annular relief 142 formed in a diopter lens tube 150. On the other hand, when the compression ring bolts 122 are tightened, it draws the compression ring 120, the second wedge ring 114, and the first wedge ring 112 into tight engagement with each other, and the wedge compression plate 140 is brought into rigid engagement with the diopter lens tube 150 so that these elements are held in a fixed angular position relative to each other.

The diopter lens tube 150 holds the lens train 130. Specifically, moving from the back of the system 100 forward, in the illustrated embodiment, there is a second meniscus lens 138, followed by a first meniscus lens 136, followed by a plano concave lens 134, followed by a plano convex lens 132. These are held in an inner bore of the diopter lens tube 150 by a retaining ring 152 that secures the lenses of the lens train rigidly within that bore.

The use of the retaining ring 152 to secure the lens train 130 provides the advantage that the specific lenses of the lens train can be changed to modify field of view (FOV), resolution, etc.

The diopter lens tube 150 of the diopter adjustment system moves longitudinally and along the optical axis of the coalignment device 100 as indicated by the diopter lens tube translation arrow 154. Specifically, this translation is accomplished by the user by rotating the diopter adjustment ring 124. As result, by rotation of the diopter adjustment ring 124, the diopter lens tube 150 is moved forward and back relative to the coalignment system 100 and a front mounting tube 160.

The front mounting tube 160 in the illustrated embodiment has external front mounting threads 126 that are used to mount the coalignment system 100 on to another optical system such as a night vision tube housing.

One advantage of the coalignment system 100 is its combination of the wedge prism pair 116, 118 along with the diopter adjustment system. As a result, the coalignment system 100 can adjust point of aim point of impact or be coaligned with another optical system, in parallel (binocular) configuration, while also providing for focus adjustment relative to the night vision tube, for example.

Figure 3:
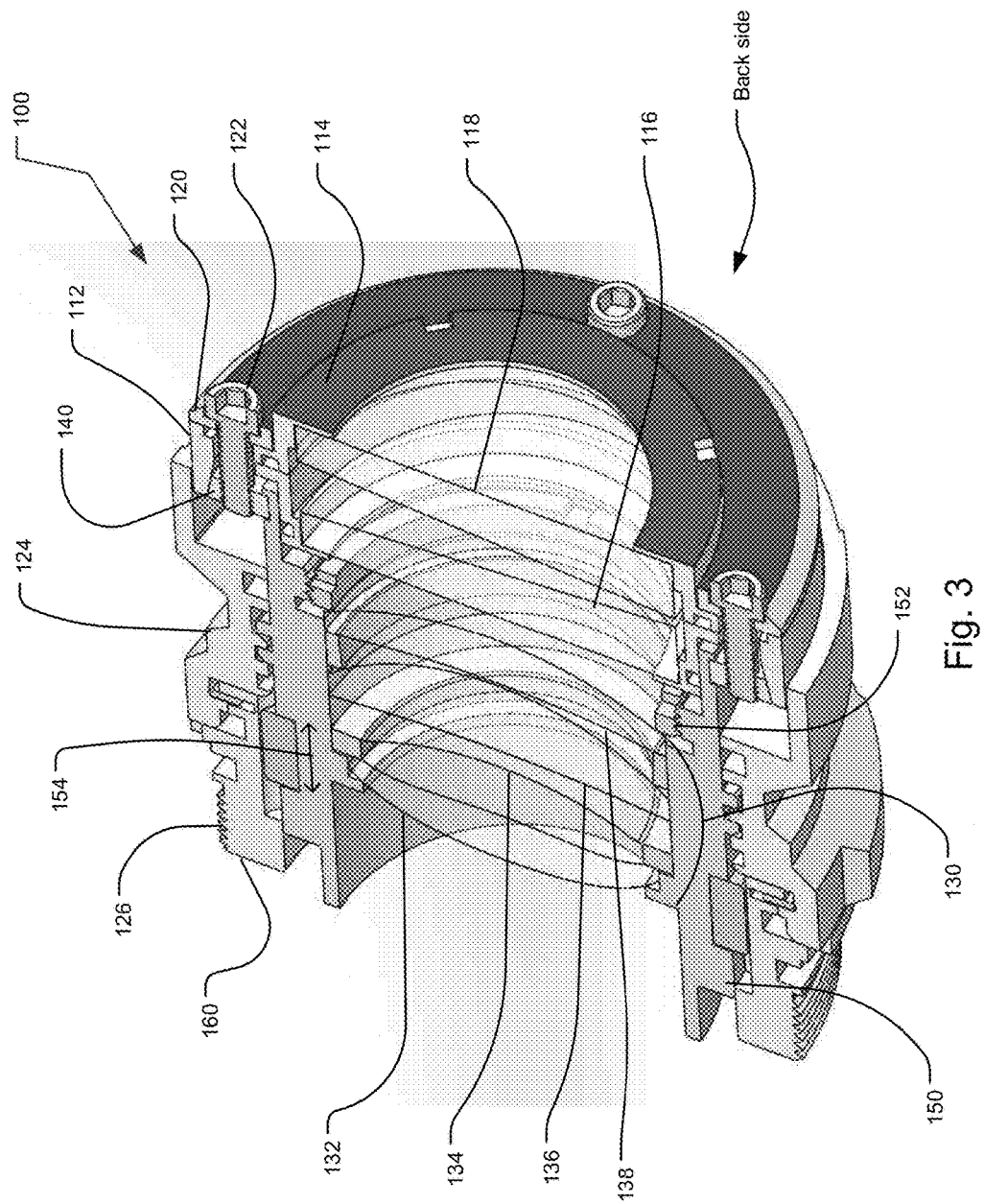
FIG. 3 is a cross sectional rotated view of the coalignment system.

FIG. 3 shows the coalignment system 100 in cross-section from another angle, further illustrating components of the lens train.

Figure 4:
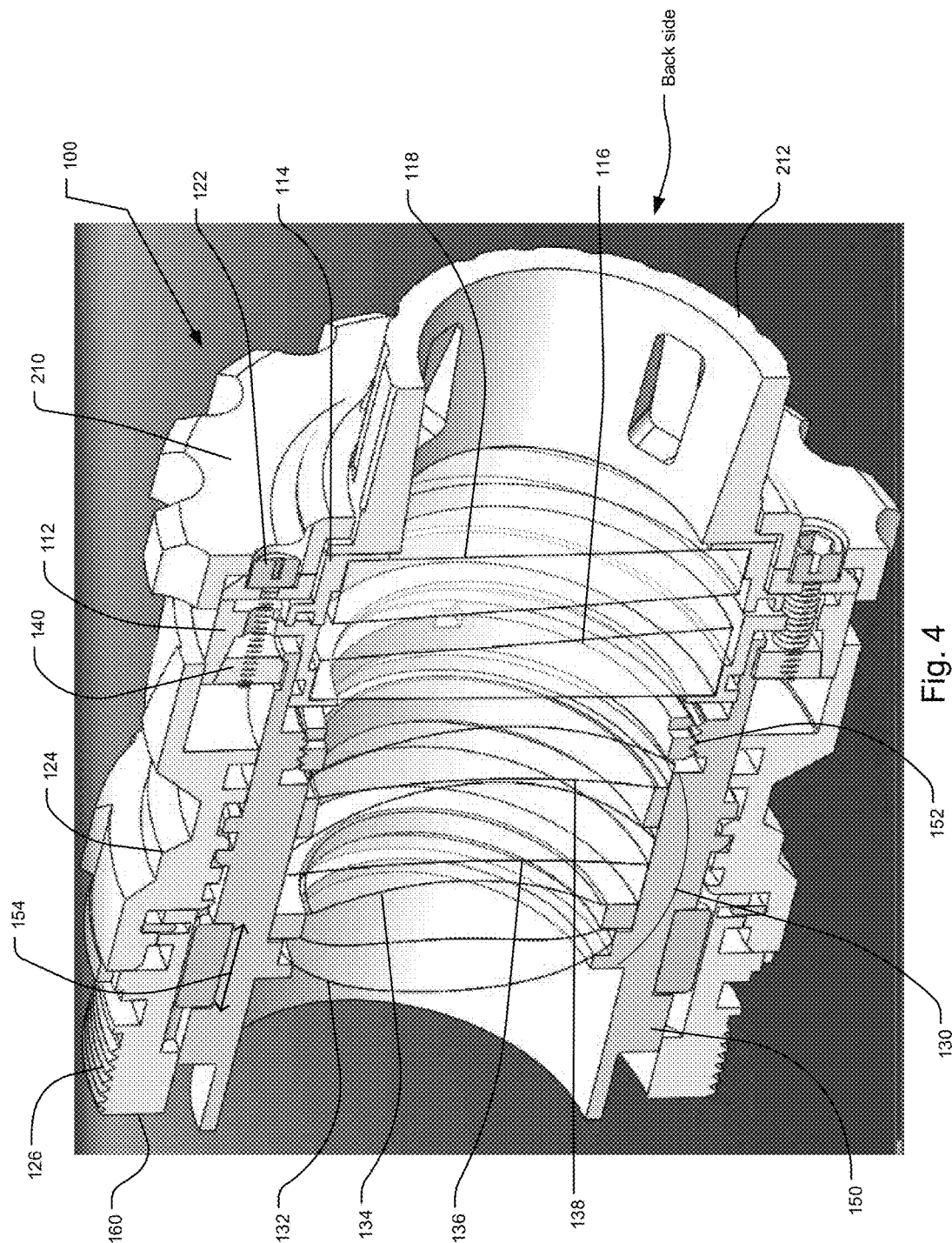
FIG. 4 is a cross-sectional view of another embodiment of the coalignment system.

FIG. 4 shows a second embodiment of the coalignment system 100. Similar components have been similarly labeled. In this embodiment, the first wedge ring 112 is provided with a nubbed first wedge grip ring 210, which allows the user to more easily engage and adjust the first wedge ring 112. Similarly, a nubbed eye relief grip ring 212 is attached to the second wedge ring 114 so that they rotate together. These nubbed rings 210, 212 allow the operator to rotate each of the wedge rings relative to each other.

Figure 5:
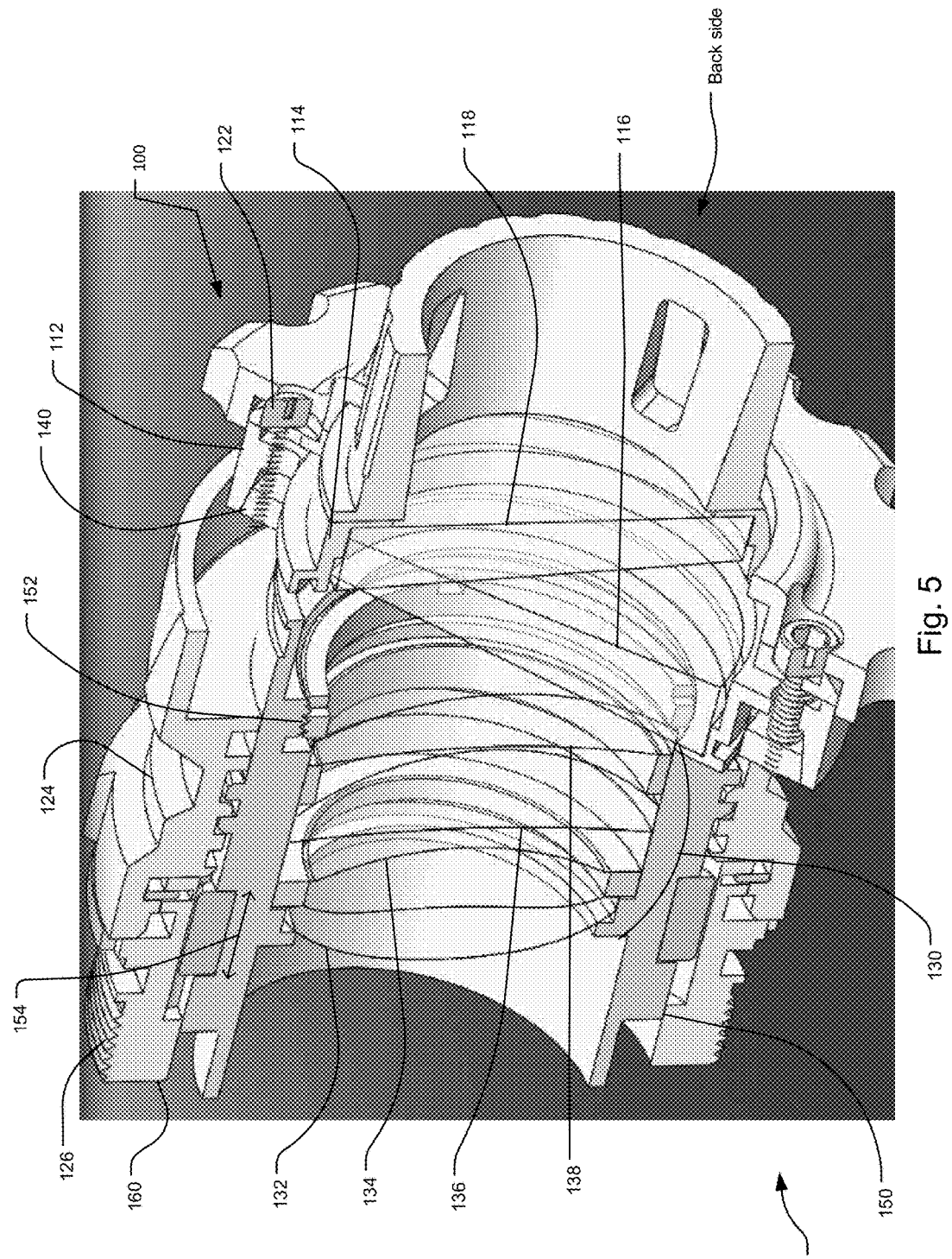
FIG. 5 is a cross-sectional view of the second embodiment of the coalignment system showing the rotation of the first wedge prism.

FIG. 5 shows the adjustment of the first wedge prism 116 by rotation of the first wedge ring 112.

Figure 6:
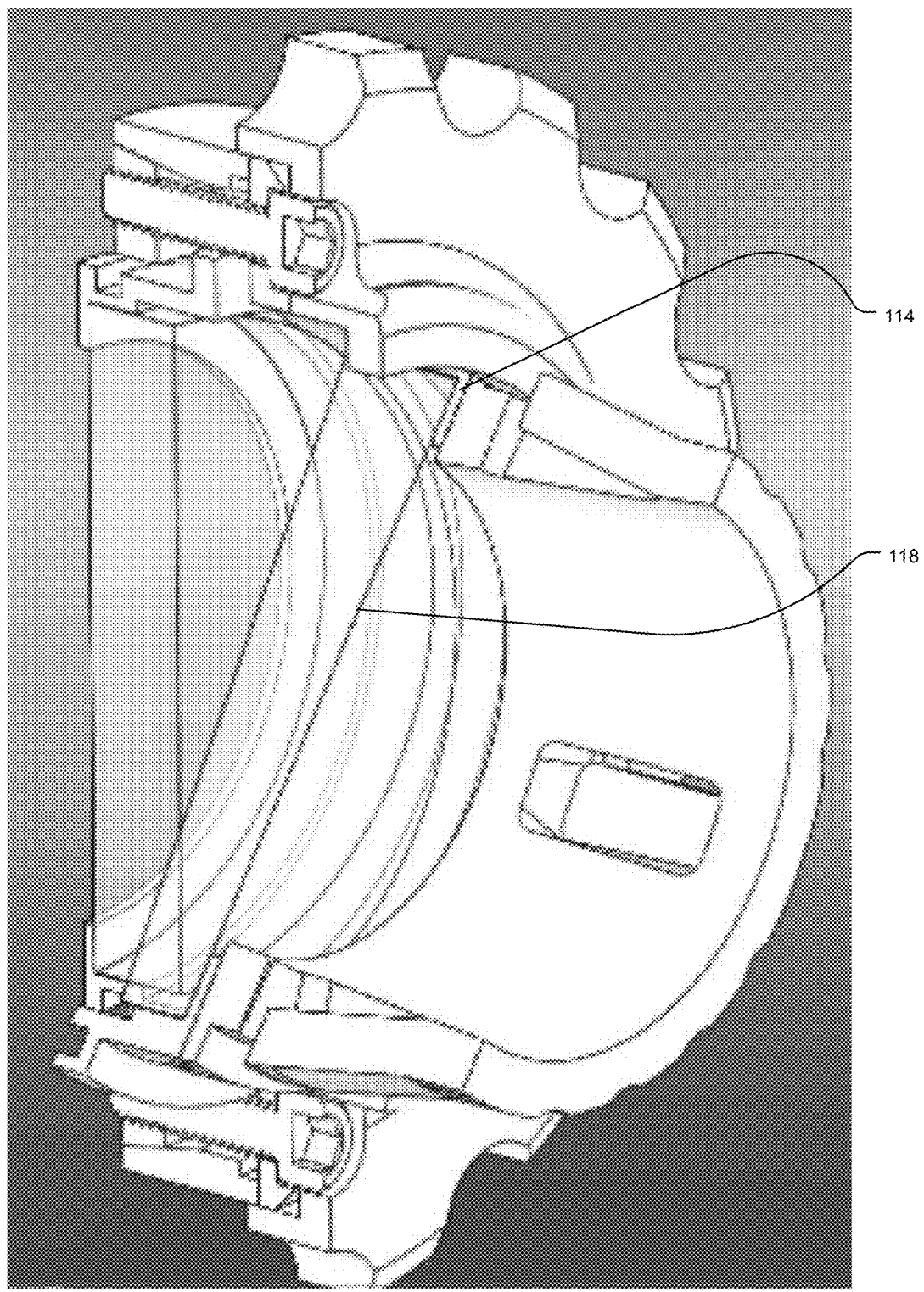
FIG. 6 is a partial cross-sectional view of the second embodiment of the coalignment system showing the rotation of the second wedge prism.

FIG. 6 is a partial cross-sectional view showing the adjustment of the second wedge prism 118 by rotation of the second wedge ring 114.

Figure 7:
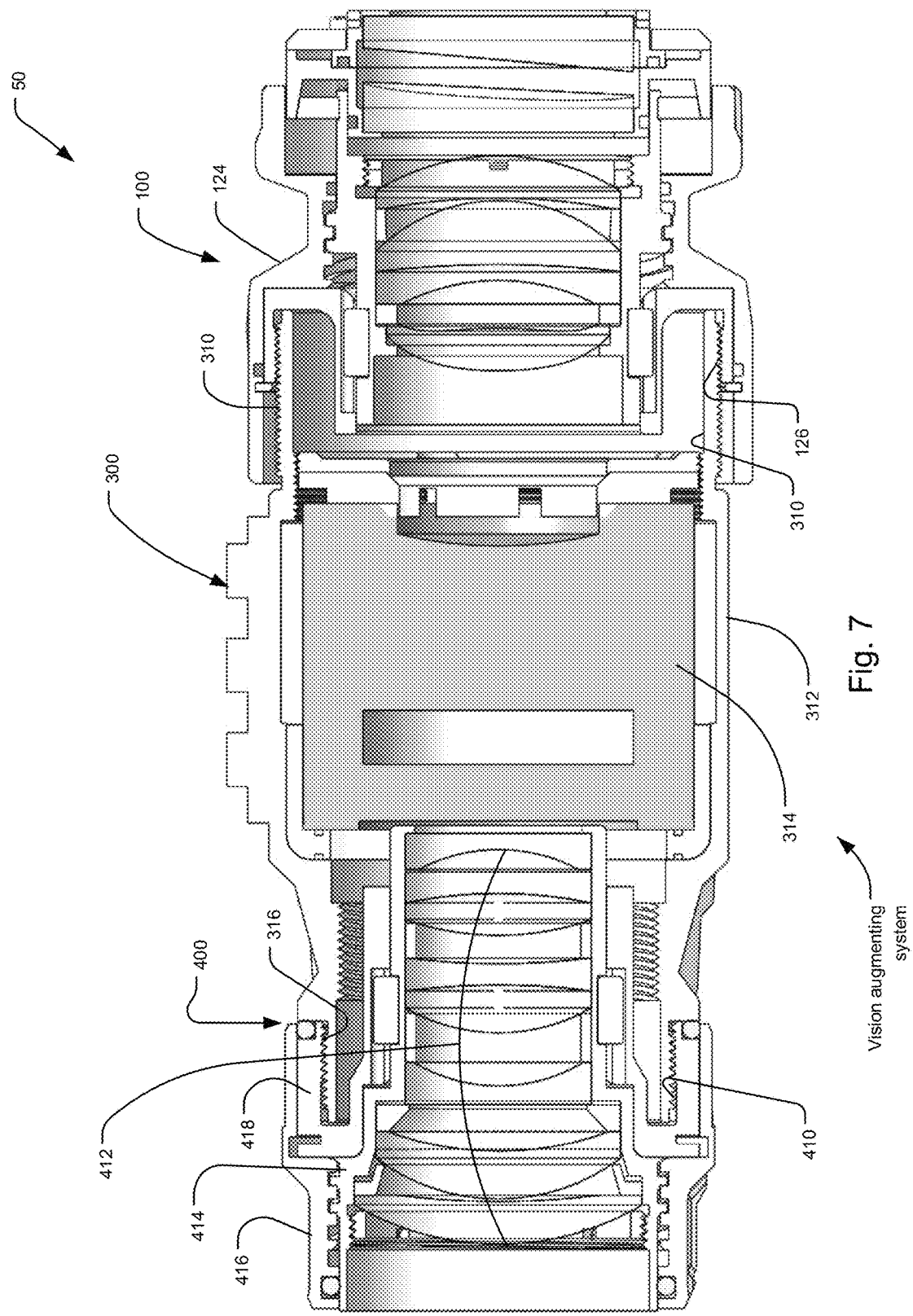
FIG. 7 is a cross-sectional view of a vision augmenting system showing the coalignment system mated to a night vision tube that has a collection optical system.

FIG. 7 shows the coalignment system 100 in one mode of operation. In this mode, it is attached to the back side of a night vision tube system 300 to form a vision augmenting system 50.

In more detail, a third embodiment of the coalignment system 100 is shown. It is slightly different from the previous embodiments. The front mounting threads 126 are arranged in an internal configuration to mate with rear mounting threads 310 on the tube housing 312 of the night vision system 300. An extended diopter adjustment ring 124 extends over the rear mounting threads of the night vision tube housing 312.

Forward of a night vision tube 314 within its housing 312 is the night vision collection optical system 400. This collection optical system is designed to collect light in lowlight conditions and relay that light for amplification in the night vision tube 314. The collection optical system 400 mounts to front threads 316 of the night vision tube housing 312 via collection threads 410. The collection optical system 400 includes a lens train 412 that is held within a collection lens tube 414. The collection lens tube can be translated along the optical axis in the collection lens housing 418 by rotation of the collection lens focusing ring 416.

Figure 8:
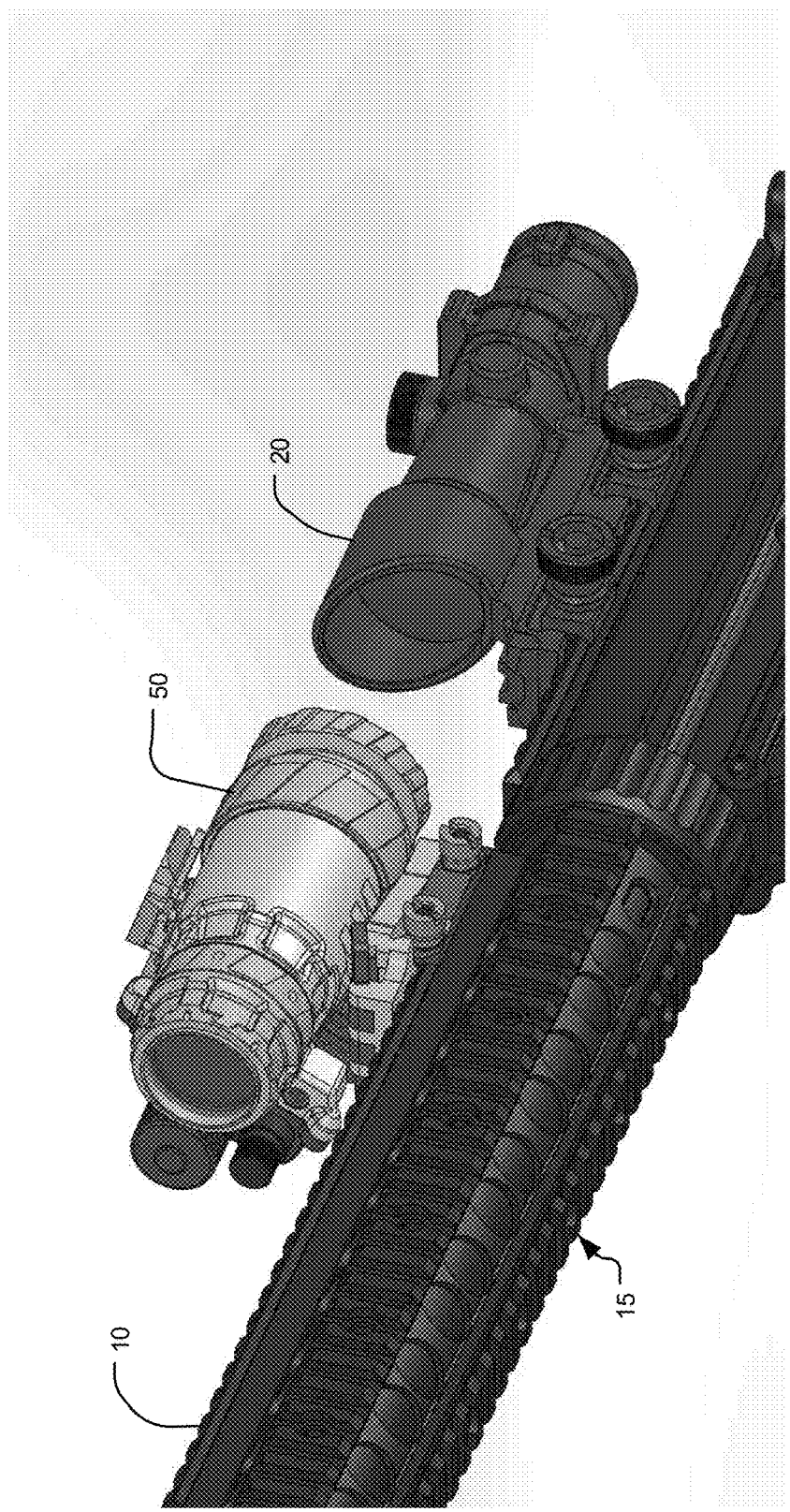
FIG. 8 is a perspective view showing the vision augmenting system with the coalignment system installed on a weapon rail of a weapon in front of a day sight.

As illustrated in FIG. 8, in one mode of operation, the vision augmenting system 50 can be installed on a weapons rail 10 of a weapon 15, in front of that weapon's day sight 20.

The diopter adjustment of the coalignment system 100 allows for the focus adjustment relative to the day sight 20 so that the focus adjustment, if any, of the day sight does not have to be changed with the addition of the augmenting system 50. This enables quick installation in the field.

Moreover, the wedge prism assembly of the coalignment system 100 allows for point of impact/point of aim adjustment so that the vision augmenting system 50 can be adapted to the existing day sight.

Figure 9:
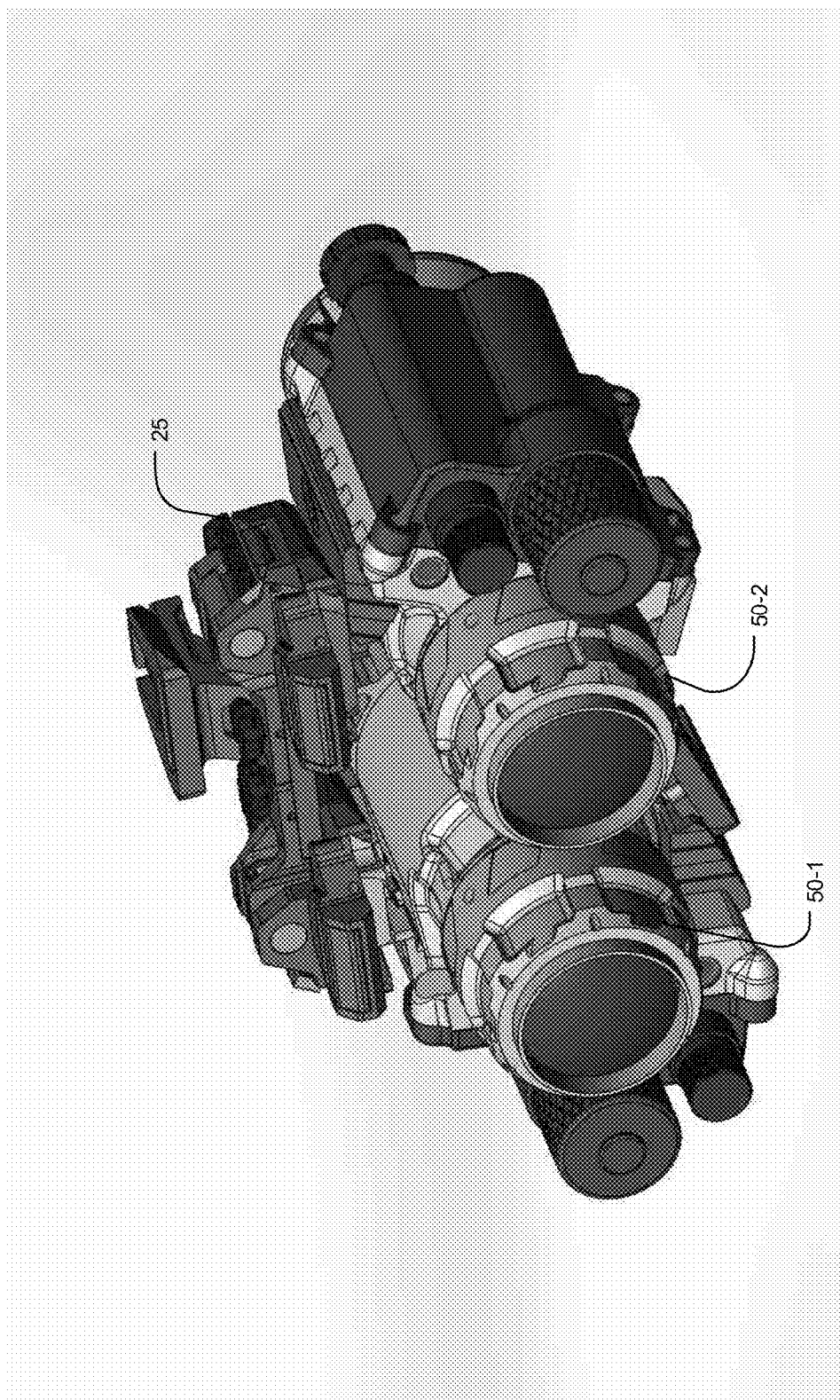
FIG. 9 is a perspective view showing left and right augmenting systems, each with the coalignment system, mounted on a night vision goggles mounting bracket.

FIG. 9 shows another embodiment in which a pair of co-aligned vision augmenting systems 50-1, 50-2 are mounted to a night vision goggles mounting bracket 25 to provide a night vision capability. This allows true goggle/binocular vision when coupled with an appropriate bridging device.

In one exemplary mode of operation, the left augmenting system is adjusted to work with the day sight of a weapon as illustrated in previous FIG. 8.

When deploying this augmenting system in the illustrated goggles, it is removed from the weapons rail 10 and attached to the night vision goggles mounting bracket 25. In this case, the coalignment system of the right augmenting system 50-1 is then adjusted to the left augmenting system 50-2 so that the two augmenting systems 50-1, 50-2 are properly aligned with respect to each other. In this way, a standard night vision tube, when paired with the inventive coalignment system, can be deployed in a number of different modes of operation, from a standalone night vision tube, to an augmenting system for a day sight of a weapon, and in night vision goggles.

Figure 10:
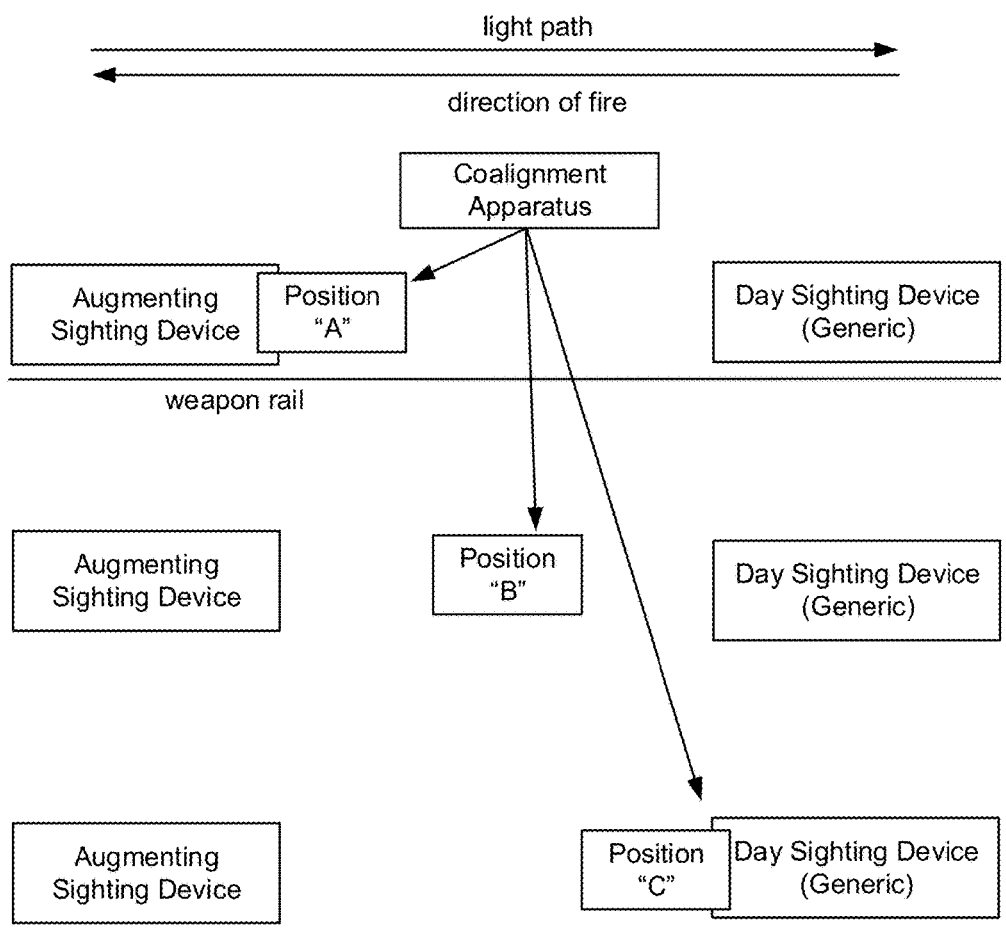
FIG. 10 is a schematic view showing the deployment of the coalignment system in different modes either attached to an augmenting sighting device in position A, located between an augmenting sighting device and a day sighting device in position B, and a third mode in which the coalignment apparatus is mounted on the day sighting device in position C.

FIG. 10 is a schematic view showing the deployment of the coalignment system in three different modes. In one implementation, the coalignment system in Position "A" is attached to an augmenting sighting device, which is located in front of a day sighting device. This is discussed hereinabove. In another implementation, the coalignment system in Position "B" is located between an augmenting sighting device and a day sighting device. In still another implementation, the coalignment system in Position "C" is attached to a day sighting device, which is located behind an augmenting sighting device.

While this invention has been particularly shown and described with references to preferred embodiments thereof, it will be understood by those skilled in the art that various changes in form and details may be made therein without departing from the scope of the invention encompassed by the appended claims.

What is claimed is:

1. A night vision goggles system, comprising:
   two vision augmenting systems, each having a night vision collection optical system and a night vision tube system; and
   a first coalignment system for at least one of the two vision augmenting systems, wherein the first coalignment system includes a wedge prism system that comprises a first wedge prism held in first wedge prism ring and a second wedge prism held in second wedge prism ring, wherein the wedge prism system further comprises a locking system that prevents rotation of the wedge prisms by locking the first wedge ring and the second wedge ring into tight engagement with each other to prevent rotation relative to each other by compression ring bolts engaging a diopter lens tube.

2. A system as claimed in claim 1, further comprising a second coalignment system, one coalignment system for each of the two vision augmenting systems, wherein the second coalignment system includes a wedge prism system that comprises a first wedge prism held in first wedge prism ring and a second wedge prism held in second wedge prism ring, wherein the wedge prism system further comprises a locking system that prevents rotation of the wedge prisms in the second coalignment system.

3. A system as claimed in claim 2, wherein the locking system of the second coalignment system includes four compression ring bolts, wherein as the compression ring bolts are tightened, they draw a compression ring, the second wedge ring, and the first wedge ring into tight engagement with each other.

4. A system as claimed in claim 1, further comprising a mounting bracket for holding the two vision augmenting systems to position said vision augmenting systems to provide a night vision capability to a wearer of said goggles system.

5. A system as claimed in claim 3, wherein the compression ring bolts are further engaged with a wedge compression plate, which when said bolts are tightened, is brought into rigid engagement with the diopter lens tube so that the wedge compression plate and the diopter lens tube are held in a fixed angular position relative to each other.

6. A system as claimed in claim 1, wherein the locking system of the first coalignment system includes four compression ring bolts, wherein as the compression ring bolts are tightened, they draw a compression ring, the second wedge ring, and the first wedge ring into tight engagement with each other.

7. A system as claimed in claim 6, wherein the compression ring bolts are further engaged with a wedge compression plate, which when said bolts are tightened, is brought into rigid engagement with the diopter lens tube so that the wedge compression plate and the diopter lens tube are held in a fixed angular position relative to each other.

* * * * *